Aug. 24, 1943.   J. B. QUIGLEY   2,327,929
WELDING MACHINE
Filed Aug. 21, 1942
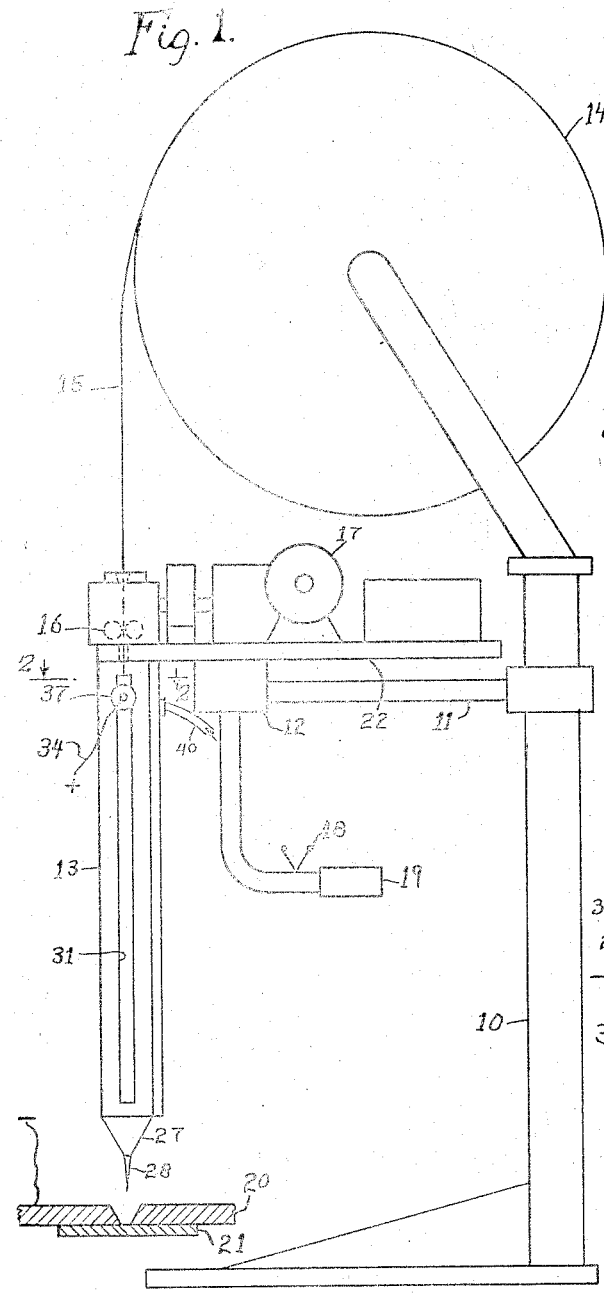
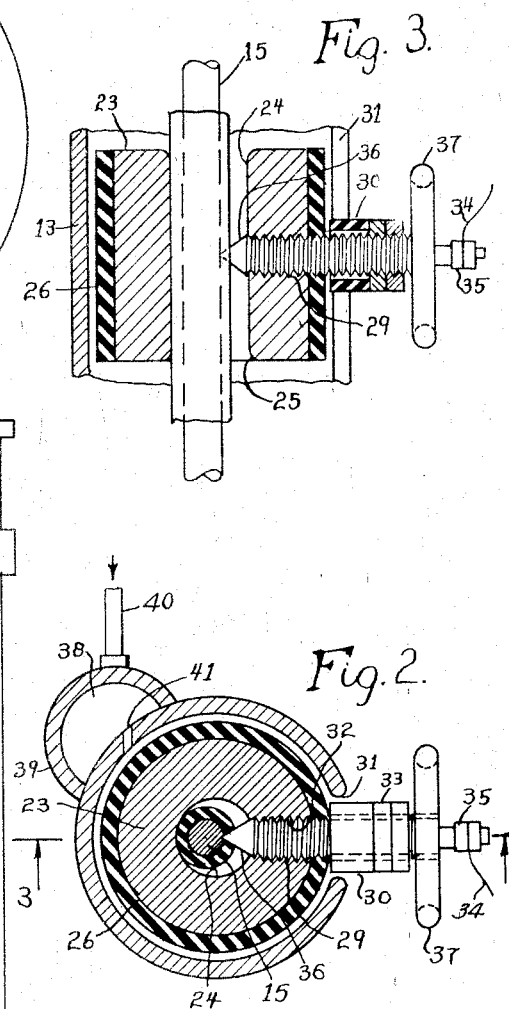
INVENTOR
JAMES B. QUIGLEY
BY F. O. Prager
ATTORNEY Patented Aug. 24, 1943

2,327,929

UNITED STATES PATENT OFFICE 2,327,929

WELDING MACHINE

James B. Quigley, Hammond, Ind., assignor to Graver Tank & Mfg. Co., Inc., a corporation of Delaware Application August 21, 1942, Serial No. 455,628

7 Claims. (Cl. 219—8)

This invention relates to welding machines. It has particular application to a relatively small, portable arc welding machine using a continuous, coated wire as welding electrode.

An object of this invention is to provide an inexpensive but efficient electrode holder for such a welding machine.

Another object is to provide an electrode holder for a welding machine, wherein the slotting, perforating or breaking of the coating material on the electrode is eliminated or reduced to a minimum.

Other objects are, to provide suitable electrode connecting and disconnecting means, feeding means, cooling means, controls, and other related devices.

Still other objects may appear as the description of this invention proceeds.

In the drawing,

Figure 1 is a diagrammatic elevation of apparatus embodying this invention.

Figure 2 is a detail section taken along the lines 2—2 in Figure 1.

Figure 3 is a further view of the same detail in a section taken along the lines 3—3 in Figure 2.

The pedestal 10 supports a bracket 11. A vertical pivot 12 at the end of this bracket has pivoted to it, by means of a short arm, the tubular, vertical electrode holder or welding head 13, which is made of steel or the like. The pedestal also supports a feed wire coil 14, wound on a suitable reel, from which the coated electrode feed wire 15 is unrolled and supplied to the top of the electrode holder by feeding rolls 16, driven by a motor-reducer 17. The starting and stopping, as well as the speed and occasional reversing of this motor can be controlled by electrical switches and controls 18, carried on a handle 19, which is so attached to the electrode holder that the operator can use it to swing the electrode holder around the pivot 12, oscillating or weaving the electrode transversely of the seam in the horizontal work 20 below the electrode holder. The table or support 21 for this work may be connected to the pedestal 10, but I prefer to make it separate or separable, so that the self-contained unit comprising the pedestal, reel, welding head, feed device, and controls may be as light and movable as possible.

The electrode wire 15 passes into the electrode holder 13 through a central opening in the closed top 22 of the holder. Inside the electrode holder the wire passes through a cylindrical sleeve 23 which is concentrically and slidably disposed in the electrode holder. In the case of electrode wire having a diameter of ¼", with a coating of ⅛" thickness thereon, the sleeve 23 may provide an axial duct 24 of approximately $\frac{7}{16}$" inner diameter so that the electrode wire may easily enter this duct. Furthermore, both ends of this duct may be widened and made smooth, as shown at 25. The sleeve 23 is made of steel or the like, with an outer, fibrous, insulating shell or coating 26. The outer diameter of this coating may be approximately 1½"; the inner diameter of the holder may then be about 1¾" and its outer diameter 2". Of course, these dimensions are given as examples only. It is important, however, that the sleeve should be capable of sliding up and down in the holder with practically no mechanical resistance, and without electrical contact, and that the electrode feed wire should be capable of being inserted into and shifted along the sleeve without undue friction.

At the start of operations, the feed wire is inserted into the sleeve 23. It is then pushed forward through the sleeve and through the discharge nozzle 27 of the holder, until the point 28 of the wire substantially contacts the work 20. At the same time, the sleeve 23 is held in its upmost position within the electrode holder. Contact is then established between the sleeve and wire. For this purpose an electrical contactor 29, protected by a fibrous insulator or sheath 30, extends radially, and without contact, through a longitudinal slot 31 in the electrode holder 13, and has screwed connection with a tapped hole 32 in the cylindrical steel wall of the sleeve 23. The insulating sheath 30 is held in position on the contactor 29 adjacent to the slot 31 by a nut 33 engaging the contactor and preventing the insulating sheath from sliding along the contactor and out of the slot. An electric wire 34 is connected to the contactor 29 by a binding post 35. This wire receives electricity from one pole of a suitable generator, transformer or the like. The other pole is connected to the work 20. Completion of the circuit for the welding process is prepared when the contactor 29, by means of a pointed and sharpened tip 36 at its front, pierces the coat of the electrode wire 15, and engages the metal thereof. This tip may have the shape of a conventional drill tip, and may be resharpened in the manner well known in connection with drill tips when it is worn out. The rear end of the contactor 29 carries a hand wheel 37 by means of which the contactor is turned forward and forced into and through the electrode coat, as well as being turned back and withdrawn therefrom.

One or two turns of the hand wheel are sufficient for this mechanical and electrical connecting or disconnecting. Instead of this wheel and screw, any conventional lever, latch or the like may be substituted; but I prefer the mechanism as described, which is inexpensive to make, easy to operate, and particularly suitable for a relatively small and light machine.

After the contactor 29 has engaged the electrode wire 15, in the upper position of the sleeve 23, the operator may start the feed motor 17, whereupon the point 28 of the electrode contacts the work 20, closing the welding circuit, and the weld metal 15 is deposited under the control of the feed motor 17 and conventional means causing suitable forward movement of the work relative to the electrode holder. The handle 19 may be used to cause transverse movements of the electrode relative to the work. As the welding proceeds, the feed wire 15 and contactor 29 move downward through the holder 13 and slot 31, respectively. When the contactor 29 reaches the lower end of the slot 31, the electric current is interrupted, either by the burning off of the point of the electrode, since the slot, as shown, reaches only over part of the length of the electrode holder, and is closed at both ends, causing the insulating sheath 30 and contactor 29 to stop at the bottom end of the slot. While the slot, accordingly, extends only over part of the length of the holder, it does extend over the greatest possible part thereof, and the top and bottom stops or closures are made as short as possible, so that the greatest possible length of travel of the contactor may be utilized, prior to the bottom stop and the burning off of the electrode. If it is desired to interrupt the welding current prior to this bottom stop, this can be achieved, of course, by an operation of the motor 17 which retracts the electrode wire, or by suitable electric switching means, or by the operator retracting the contactor 29, or in some other obvious manner. Thereupon, the operator may raise the wheel 37, with the contactor 29 retracted. In the top position, another stop is reached, and the contactor may be turned forward again.

Thus the process can be repeated indefinitely. The only manipulations required are, to disengage the contact by turning the wheel back, to raise the contact by raising the wheel, to reengage the contact by turning the wheel forward, and to control a welding process by suitably steering the nozzle and manipulating the switches. The nozzle of course has its lower end above the work, when vertically installed; its upper end is preferably disposed at such an elevation that an operator can readily shift the wheel and contactor from the lower to the upper end. Since the average human being can readily work over a distance of about 8 feet without changing his place it follows that the length of slot 31, in a light, portable, machine according to this invention, may be any desired one up to about 8 feet.

Of course, the welding process can also be interrupted at will before the sleeve 23 has reached its lowest point; for instance, by causing the feed motor 17 to run a short distance in reverse direction.

I provide an air duct 38 formed by a half pipe 39 longitudinally welded to the outside of the electrode holder tube 13. This duct is closed at the bottom and top, and receives compressed air through a flexible hose 40, from a suitable compressor. A plurality of superposed openings 41 in the wall of the electrode holder 13 connect the air duct 38 to the interior of the electrode holder, so that the latter may serve as a cooling chamber for the electrode. These openings are preferably drilled so as to enter the interior of the electrode holder tangentially, causing a swirl of air around the electrode. A greater number of openings may be provided at the lower end of the cooling chamber than in the upper portions. The air escapes through the slot 31.

While a vertical electrode holder for continuous wires has been described, it will be understood that this, and other details hereof, are subject to considerable modifications.

I claim:

1. In a welding machine for coated electrodes, means adapted to feed a continuous electrode, a tubular electrode holder adapted to receive the electrode from the feeding means, said holder having a longitudinal slot in the tubular wall thereof, a member slidably disposed within said holder and adapted to surround the electrode received therein, a contactor extending from the outside of said holder through said slot into said slidable member, an electrical binding post attached to said contactor on the outside of said holder, and means associated with said contactor and adapted to cause the same to engage and disengage the electrode surrounded by said slidable member, said contactor having a portion within said slidable member adapted to pass through the coating of the electrode upon engaging the same.

2. In a welding machine for endless, coated electrodes, means adapted to hold such an electrode, a tubular electrode holder adapted to receive the electrode from said means, said holder having a longitudinal slot in the tubular wall thereof, feeding means adapted to move the electrode from said means into the holder, a member slidably disposed within said holder and having a duct therein which is parallel to the axis of said tubular holder, smooth at its ends, and adapted to surround the electrode received in said slidable member, a contactor extending from the outside of said holder through said slot into said slidable member, an electrical binding post attached to said contactor on the outside of said holder, and means adapted to cause said contactor to engage and disengage the electrode surrounded by said slidable member, said contactor having a portion within said slidable member adapted to pass through the coating of the electrode upon engaging the same.

3. In a welding machine for long coated electrodes, means adapted to supply such electrodes, a tubular electrode holder adapted to receive an electrode from the supplying means, said holder having a longitudinal slot in the tubular wall thereof, a member slidably disposed within said holder and adapted to surround the electrode received therein, a contactor extending from the outside of said holder through said slot into said slidable member, an electrical binding post attached to said contactor on the outside of said holder, means associated with said contactor and adapted to cause the same to engage and disengage the electrode surrounded by said slidable member, said contactor having a portion within said slidable member adapted to pass through the coating of the electrode upon engaging the same, and means adapted to feed compressed air to the inside of said tubular electrode holder, whereby said air will cool the electrode received in said holder and then escape through said slot.

4. In a welding machine for continuous coated electrodes, means adapted to feed a continuous electrode, a hollow, cylindrical, metallic electrode holder adapted to receive the electrode from the feeding means, said holder having a longitudinal slot in the cylindrical wall thereof, a cylindrical metallic sleeve within said holder electrically insulated therefrom, and adapted to surround the electrode received therein, an insulated contactor extending from the outside of said holder through said slot into said sleeve, an electrical binding post attached to said contactor on the outside of said holder, and means associated with said contactor and adapted to cause the same to engage and disengage the electrode surrounded by said sleeve, said contactor having a portion within said sleeve adapted to pass through the coating of the electrode upon engaging the same.

5. In a welding machine for continuous coated electrodes, means adapted to feed a continuous electrode, a tubular electrode holder adapted to receive the electrode from the feeding means, said holder having a longitudinal slot in the tubular wall thereof, a member slidably disposed within said holder and adapted to surround the electrode received therein, a contactor freely extending from the outside of said holder through said slot and having threaded engagement with said slidable member, an electrical binding post attached to said contactor on the outside of said holder, and means associated with said contactor and adapted to turn the same whereby it may engage and disengage the electrode surrounded by said slidable member, said contactor having a portion within said slidable member adapted to perforate the coating of the electrode upon being turned forward into the same.

6. In a welding machine, a supporting means, means on said supporting means adapted to supply and feed an electrode towards a piece of work, a tubular holder and welding head above said work, pivotally supported from said supporting means, and adapted to receive an electrode from the supplying means, and to hold the point of the electrode over the work as the electrode is being supplied towards the work, said holder having a longitudinal slot in the tubular wall thereof, a handle attached to said holder whereby the same can be turned with respect to said supporting means and reciprocated with respect to said work, a member slidably disposed within said holder and adapted to surround the electrode received therein, a contactor extending from the outside of said holder through said slot into said slidable member, an electrical binding post attached to said contactor on the outside of said holder, and means associated with said contactor and adapted to cause the same to engage and disengage the electrode surrounded by said slidable member.

7. In a welding machine a pedestal, a reel for coated electrode wire on top of said pedestal, a bracket between the top and bottom of said pedestal, a substantially vertical, tubular holder and welding head supported by said bracket, and adapted to receive electrode wire from said reel, said holder extending upwardly from above the floor for said pedestal to a point approximately eight feet above said floor whereby the welding work can be placed below the holder, and an operator can readily reach the top and bottom of the holder, a longitudinal slot in the tubular wall of said holder, extending over substantially the whole of said length thereof, except for a short length thereof at the top and another short length thereof at the bottom, where said slot is closed, a sleeve within said holder, electrically insulated therefrom and adapted to surround the electrode wire received therein, an insulated contactor extending from the outside of said holder through said slot into said sleeve, and an electrical binding post attached to said contactor on the outside of said holder, said contactor being adapted to engage and disengage the electrode wire in said sleeve, through the coating of the electrode wire.

JAMES B. QUIGLEY.